(12) United States Patent
Wang et al.

(10) Patent No.: US 7,727,410 B2
(45) Date of Patent: Jun. 1, 2010

(54) PROCESS FOR FORMATION OF THREE-DIMENSIONAL PHOTONIC CRYSTAL

(75) Inventors: Shinan Wang, Kashiwa (JP); Kenji Tamamori, Ebina (JP); Haruhito Ono, Minamiashigara (JP); Masahiko Okunuki, Akiruno (JP)

(73) Assignee: Canon Kabushiki Kaisha, Tokyo (JP)

( * ) Notice: Subject to any disclaimer, the term of this patent is extended or adjusted under 35 U.S.C. 154(b) by 785 days.

(21) Appl. No.: 11/703,109

(22) Filed: Feb. 7, 2007

(65) Prior Publication Data

US 2007/0196066 A1 Aug. 23, 2007

(30) Foreign Application Priority Data

Feb. 21, 2006 (JP) .............................. 2006-043968

(51) Int. Cl.
*G02B 6/10* (2006.01)
(52) U.S. Cl. .............................. 216/24; 216/46; 216/67; 385/129
(58) Field of Classification Search ........................ None
See application file for complete search history.

(56) References Cited

U.S. PATENT DOCUMENTS

| | | | | |
|---|---|---|---|---|
| 5,335,240 A | 8/1994 | Ho et al. | | 372/39 |
| 6,225,637 B1 | 5/2001 | Terashima et al. | | 250/492.2 |
| 6,485,870 B1 | 11/2002 | Uchikawa | | |
| 6,818,911 B2 | 11/2004 | Tamamori et al. | | 250/492.22 |
| 6,870,310 B2 | 3/2005 | Okunuki et al. | | 313/446 |
| 7,023,055 B2 | 4/2006 | Ieong et al. | | |
| 7,158,711 B2 * | 1/2007 | Tokushima | | 385/131 |
| 7,161,188 B2 * | 1/2007 | Orita | | 257/98 |
| 7,599,277 B1 | 10/2009 | Kato et al. | | |
| 7,622,367 B1 * | 11/2009 | Nuzzo et al. | | 438/472 |
| 2002/0074307 A1 * | 6/2002 | Cotteverte et al. | | 216/2 |
| 2003/0109133 A1 | 6/2003 | Girardie et al. | | |
| 2006/0245716 A1 * | 11/2006 | Uchida | | 385/147 |

(Continued)

FOREIGN PATENT DOCUMENTS

JP 11-338124 A 12/1999

(Continued)

OTHER PUBLICATIONS

C. C. Cheng, et al., "Fabrication of photonic band-gap crystals", J. Vac. Sci. Technol. B, vol. 13, No. 6, Nov./Dec. 1995, pp. 2696-2700.

(Continued)

*Primary Examiner*—Allan Olsen
(74) *Attorney, Agent, or Firm*—Fitzpatrick, Cella, Harper & Scinto (57) ABSTRACT

A process for forming a three-dimensional photonic crystal comprises the steps of providing a base material having a first face and a second face adjoining to each other at a first angle, forming a first mask on the first face, dry-etching the first face in a direction at a second angle to the first face to remove a portion of the base material not protected by the first mask, forming a second mask on the second face, and dry-etching the second face in a direction at a third angle to the second face to remove a portion of the base material not protected by the second mask.

12 Claims, 7 Drawing Sheets

U.S. PATENT DOCUMENTS

2007/0196066 A1    8/2007    Wang et al. ................ 385/129
2008/0131660 A1    6/2008    Noda et al.

FOREIGN PATENT DOCUMENTS

| | | |
|---|---|---|
| JP | 2001-074954 | 3/2001 |
| JP | 2001-92111 A | 4/2001 |
| JP | 2003-234414 A | 8/2003 |
| JP | 2004-219688 | 8/2004 |
| JP | 2005-136410 A | 5/2005 |
| JP | 2006-259081 A | 9/2006 |
| WO | 00/28536 A1 | 5/2000 |
| WO | 2006/095648 A1 | 9/2006 |

OTHER PUBLICATIONS

J. Schilling, et al., "Three-dimensional macroporous silicon photonic crystal with large photonic band gap", Applied Physics Letters, vol. 86, 2005, pp. 011101-1-011101-3.

\* cited by examiner

| | SHAPE OF CROSS SECTION |
|---|---|
| I | |
| II | |
| III | |
| IV | |
| V | |
| VI | |
| VII | |
| VIII | |
| IX | |
| X | |
| XI | |

PROCESS FOR FORMATION OF THREE-DIMENSIONAL PHOTONIC CRYSTAL

BACKGROUND OF THE INVENTION

1. Field of the Invention

The present invention relates to a process for formation of a three-dimensional photonic crystal having a three-dimensional fine structure.

2. Description of the Related Art

The photonic crystal is a structure in which materials different in refractive index are periodically distributed. The refractive index difference between the constituting materials, and the periodicity in the structure give, as the most important characteristic of the photonic crystal, a photonic band gap, namely a region through which a specified electromagnetic wave cannot propagate. Introduction of an appropriate suitable defect into the refractive index distribution in the photonic crystal forms an energy level (defect level). Owing to this defect, the photonic crystal is capable of controlling an electromagnetic wave. Therefore, the photonic crystal is an artificial material which can realize a novel function readily by structure design. Moreover a device employing the photonic crystal can be far smaller than conventional devices.

A three-dimensional photonic crystal has three-dimensional periodicities of the refractive index of the constitution material, being less liable characteristically to cause leakage of an electromagnetic wave from the defect position. Therefore, the three-dimensional photonic crystal is the most suitable material for controlling electromagnetic wave propagation. Typical three-dimensional photonic crystals have a woodpile structure (or a rod-pile structure) as described in U.S. Pat. No. 5,335,240.

Figure 7:
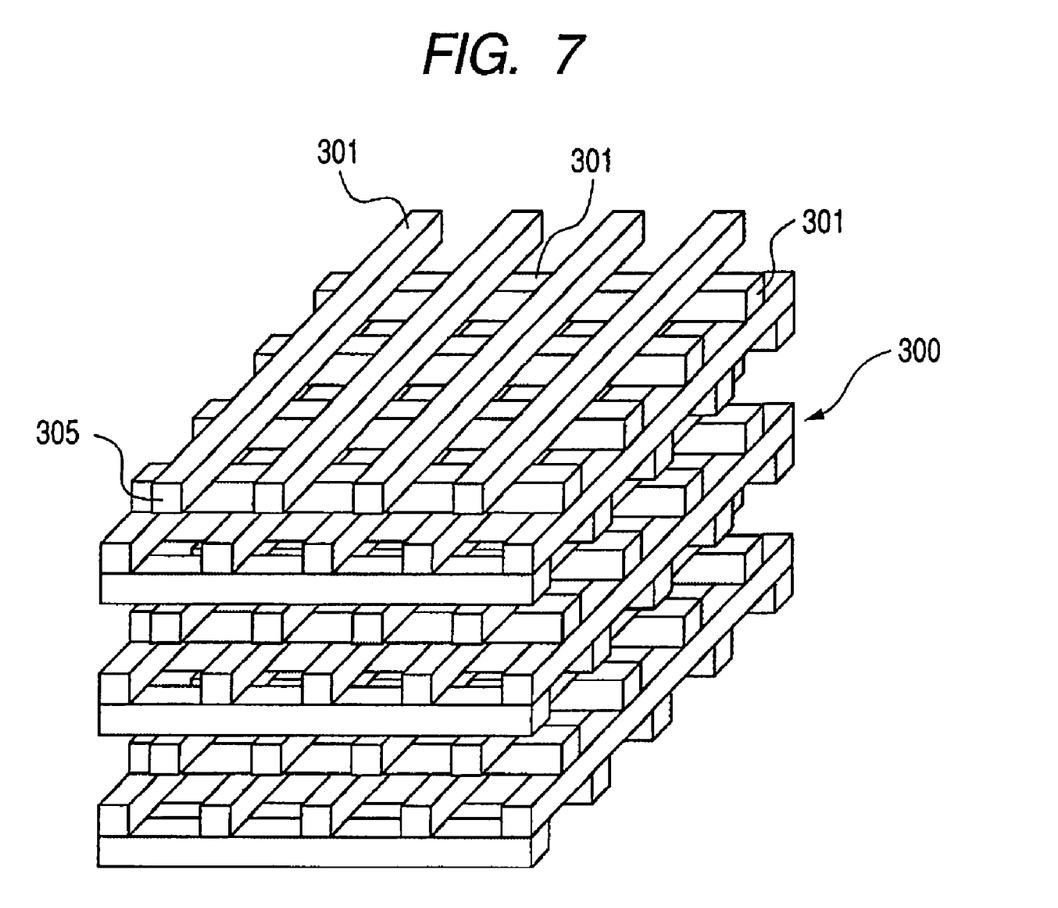
FIG. 7 is a schematic drawing of a three-dimensional photonic crystal having a woodpile structure.

FIG. 7 illustrates a woodpile structure of the three-dimensional photonic crystal which is constituted of lamination of striped layers having respectively plural rods arranged parallel and periodically at prescribed in-plane periods. The rods in one striped layer (a first layer) cross perpendicularly the rods in an adjacent striped layer (a second layer), and are directed parallel to the rods in the striped layer (a third layer) next to the adjacent striped layer (the second layer) mentioned above with positional shift by half of the in-plane arrangement period. The rod-arrangement period in the photonic crystal structure is about a half of the wavelength to be controlled. For example, in the photonic crystal device for control of visible light, the in-plane arrangement period of the rods is about 250 nm.

Such a three-dimensional photonic crystal, although expected to have ideal device characteristics, has a complicated structure, and is produced usually through many complicated steps. For controlling a shorter wavelength of an electromagnetic wave, the required structural period should be smaller, and the critical dimension (CD) for the required structure should be smaller. This requires strict precision in the positional registration between the layers and in the structure processing.

A layer lamination technique for production of a three-dimensional photonic crystal is disclosed in Japanese Patent Laid-Open No. 2004-219688. In practicing this technique, firstly, on a striped layer formed on a substrate, a rod array is formed which contains parallel rods arranged at a prescribed in-plane arrangement period. Then two of the above striped-layers are joined by fusion bonding with positional registration. Then the substrate of the one-striped layer is removed. By repeating such an operation, a woodpile structure has layers in number corresponding to the number of the joining operations. By such a lamination technique, a three-dimensional photonic crystal having a relatively complicated structure can be produced.

Another production process of the three-dimensional photonic crystal is disclosed in APPLIED PHYSICS LETTERS 86, 011101 (2005). In this process, a three-dimensional photonic crystal is formed from silicon crystal by photoelectric chemical etching of a first face and FIB-drilling of a second face to remove a part of the silicon.

The three-dimensional photonic crystal, for achieving intended device characteristics, should have a dimension of prescribed number of the arrangement periods in the thickness direction as well as in the in-plane direction. Generally, the number of the arrangement periods in the thickness direction is 3 or more. Thus the above woodpile structure should have a lamination structure of 12 or more striped layers. Further, for achieving intended device characteristics, the processing error and the layer registration error should be made smaller.

In a woodpile structure of the three-dimensional photonic crystal, for example, the processing error of each of the rods is preferably not larger than about 10% of the rod arrangement period, and the positional registration error between the layers is preferably not larger than about 25% of the rod arrangement period. For a photonic crystal device for visible light, in which the in-plane rod arrangement period is about 250 nm, the rod processing error is not larger than about ±25 nm, and the layer registration error is not larger than about ±60 nm.

However, for production of the three-dimensional photonic crystal through a conventional lamination process, although a conventional semiconductor technique can be applied, the process is complicated, and the number of the production steps increases in proportion to the number of layers of the photonic crystal to increase technical difficulty and to lower the productivity. Moreover, positional registration of the layer should be conducted in each of the lamination operations, which will accumulate necessarily the registration errors. Further, at the interfaces between the layers, simultaneously with occurrence of discontinuity of the materials (or refractive index), dirt adhesion or contamination can occur unavoidably in the production process, causing undesired scattering of electromagnetic waves. Furthermore, increase of the number of the layers will increase stress in the structure to cause deformation of the structure. Such disturbances in the structure affect adversely the characteristics of the photonic crystal device.

In formation of three-dimensional photonic crystal from silicon crystal by a photoelectric chemical etching and FIB drilling as described in APPLIED PHYSICS LETTERS 86, 011101 (2005) (Non-Patent Document 2), the problems below arise.

Firstly, selection of the material of the base material is limited. When electrochemical etching is employed, the material should be selected which can be etched electrochemically, and the crystal face for the etching and the shape of the pores are also limited. Therefore, the flexibility in design and processing is low.

Secondly, in FIB drilling for formation of the three-dimensional photonic crystal, broken pieces of the base material sputtered by the ions can deposit again on the lateral walls of the pores unavoidably. Further, in the FIB drilling, a part of the ions are scattered and penetrates through the side walls of the pores into the base material of the photonic crystal to deteriorate the optical and electrical characteristics. Furthermore, the FIB which drills the pore one by one is not suitable for processing a large area, so that a large three-dimensional photonic crystal cannot readily be formed only by the FIB drilling at a low cost.

The present invention intends to provide a three-dimensional structure with high precision, in particular to provide a nano-photonic crystal structure, and a production process thereof at a lower production cost by solving the above problems.

SUMMARY OF THE INVENTION

The present invention is directed to a process for forming a three-dimensional photonic crystal, which comprises the steps of: providing a base material having a first face and a second face adjoining to each other at a first angle; forming a first mask on the first face; dry-etching the first face in a direction at a second angle to the first face to remove a portion of the base material not protected by the first mask; forming a second mask on the second face; and dry-etching the second face in a direction at a third angle to the second face to remove a portion of the base material not protected by the second mask.

The base material of the three-dimensional crystal can be a single crystal or a dielectric material in an amorphous state.

The first mask and the second mask can be respectively a patterned deposit formed on the first face or the second face by chemical vapor deposition induced by at least one energy beam selected from focused electromagnetic waves of electron beams, focused ion beams and laser beams.

The first mask and the second mask can be formed from at least one material selected from the group consisting of C, W, Mo, Ni, Au, Pt, GaN, Si, and $SiO_2$, and contain impurity materials at a content not more than 50%.

The process can further comprise the steps of: forming a coating film on at least a part of the face of the base material before formation of the masks, and removing selectively at least a part of the coating film by etching treatment after the formation of the masks.

The step of forming the coating film can be conducted by heat-treating the base material in an environmental gas to allow the surface component of the base material to react with the environmental gas to form an oxide film or nitride film on at least a part of the surface of the base material.

In the step of forming a coating film, the coating film can be formed on at least a portion of the surface of the base material by chemical vapor deposition or atomic layer deposition.

The coating film can be formed from at least one material selected from Cu, W, TiN, $Si_3N_4$, SiN and $SiO_2$.

The etching treatment can be conducted by any of reactive ion etching, directional accelerated particle beam etching, reactive gas etching, and corrosive liquid etching.

The step of dry-etching can be conducted by reactive ion etching, or directional accelerated particle beam etching.

The first angle can range from 10° to 170°.

The second angle and the third angle can range respectively from 10° to 90°.

Further features of the present invention will become apparent from the following description of exemplary embodiments with reference to the attached drawings.

DESCRIPTION OF THE EMBODIMENTS

The best mode for practicing the present invention is described below by reference to the drawings. Incidentally, in the drawings, the same elements are denoted by the same numerals and symbols.

FIGS. 1A to 1J illustrate a process for formation of a three-dimensional periodic structure, in particular a three-dimensional nano-photonic crystal of the present invention. In FIGS. 1A to 1J, the numerals denote the followings: 10, a substrate; 20, a photonic crystal base material (also called a precursor); 100, a first face of the photonic crystal base material; 200, a second face of the photonic crystal base material adjoining to the first face; 31, a first angle of adjoining between first face 100 and second face 200.

The first face and the second face of the photonic crystal of the present invention are described below.

In the present invention, the first face and the second face signify respectively a face to be processed of the base material constituting the photonic crystal in a polyhedron shape. The first face and the second face are adjoining to each other. The first and second faces to be processed are selected suitably in consideration of design of the photonic crystal, ease of the processing (handling), the processing scale, the processing cost, and so forth.

In the present invention, processing of the faces of the photonic crystal may be conducted through a lateral face (end face) and another lateral face adjoining thereto, or may be conducted through the main face (upper face or surface) and a lateral face adjoining thereto.

The adjoining angle between the first face and the second face is not limited to the right angle, but may be selected corresponding to the design of the intended photonic crystal in the angle range from 10° to 90°. The adjustment of the adjoining angle between the first face and the second face gives greater flexibility in design of the photonic crystal.

The process for forming the photonic crystal of the present invention is described below specifically.

Figure 1A:
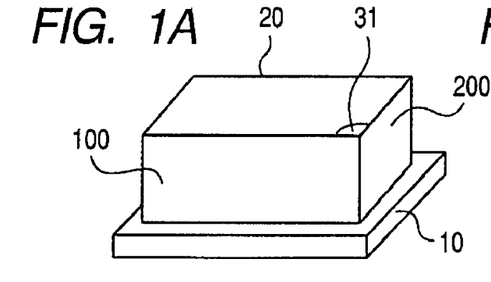
FIGS. 1A, 1B, 1C, 1D, 1E, 1F, 1G, 1H, 1I and 1J are drawings for explaining an embodiment of production of the three-dimensional periodic structure of the present invention.

As illustrated in FIG. 1A, base material 20 for the photonic crystal is prepared. Base material 20 is processed by a conventional semiconductor processing technique. Base material 20 may be turned out from substrate 10, or may be prepared from another material and bonded onto substrate 10. The suitable material for base material 20 may be a single crystal or an amorphous dielectric material, including specifically Si, GaN, GaAs, InP, InGaAs, $TiO_2$, $SiO_2$, and ZnO. The size of base material 20 ranges preferably from 1 µm to 1000 µm in length, breadth, and height, respectively. Adjoining angle 31 between first face 100 and second face 200 ranges preferably from 10° to 170°.

Figure 1B:
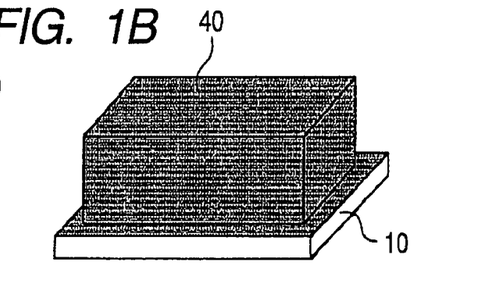

In the step of forming the photonic crystal of the present invention, as illustrated in FIG. 1B, coating film 40 may be formed, as necessary, to coat the surface of base material 20 and substrate 10. Coating film 40 serves as a secondary mask or a strengthening mask in the later step of etching of the base material. However, this coating film-forming step may be omitted, if not necessary, in consideration of the processing accuracy, the material used, the etching conditions, the tact time, the formation cost, and so forth.

Coating film 40 is suitably formed in the present invention by heat-treatment of base material 20 in a gas atmosphere to allow the surface component to react with the surrounding gas atmosphere to form an oxide or nitride film on the surface. For example, base material 20 composed of Si is heat-treated in an oxygen atmosphere at 100° C. for 10 minutes to several hours to form a $SiO_2$ coating film of 10 nm to several μm thick on the surface of base material 20.

The coating film of base material 20 can be formed otherwise by chemical vapor deposition, or atomic layer deposition. Such a deposition method enables formation of various coating film irrespective of the constituting material of base material 20. The material of the coating film includes metals such as Cu and W; nitrides such as TiN, $Si_3N_4$, SiN, and GaN; and oxides such as $SiO_2$. The material is preferably more resistant to etching than the base material in the later etching treatment.

Figure 1C:
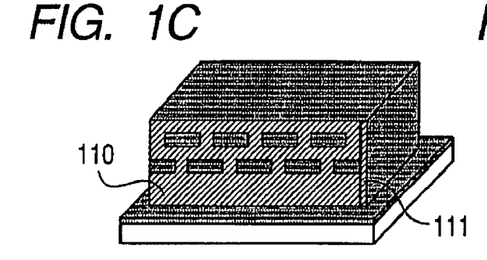

In the next step, as illustrated in FIG. 1C, first mask 110 is formed on first face 100 of the base material having been coated with coating film 40. In this first mask formation, for protection of the coating film on second face 200, protection mask 111 is preferably formed in a width nearly equal to the thickness of coating film 40 on the edge portion of first face 100 adjoining to second face 200. The masks, which are formed on the lateral face of base material 20, cannot be formed by a usual electron beam exposure process or a usual optical exposure process.

First mask 110 is formed with a deposit in a prescribed pattern by electron beam-induced chemical vapor deposition (EB-CVD). This technique enables formation of a fine mask pattern of about 5 nm. Otherwise, the mask pattern may be formed, depending on the required dimensional accuracy of the mask pattern, by an induced chemical vapor deposition by irradiation of energy beam other than the electron beam, such as chemical vapor deposition induced by a focused ion beam (FIB-CVD), and chemical vapor deposition induced by a laser beam-containing focused electromagnetic wave (e.g., laser-assisted CVD). The above energy beam-induced chemical vapor deposition methods may be employed in combination.

The material constituting the deposit for forming the pattern of first mask 110 includes inorganic material such as C, and Si; metals such as W, Mo, Ni, Au, and Pt; oxides such as $SiO_2$; and compounds like GaN. The allowable content of an impurity in the deposit is not more than 50%, ideally 0%, without a lower content limit according to the findings of the inventor of the present invention.

Figure 1D:
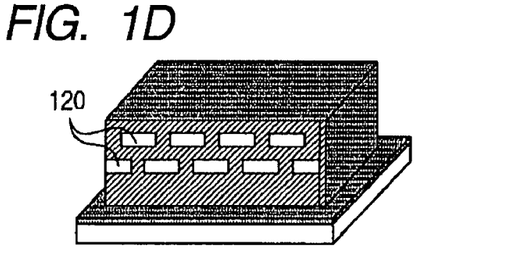

In the next step, as illustrated in FIG. 1D, the portions of the coating film not protected by first mask 110 on the first face is removed to bare portions 120 of first face 100.

The coating film, which is formed from $SiO_2$, is preferably removed by dry etching, especially by reactive ion etching. Depending on the material of the coating film, various etching method may be employed such as etching by directive accelerated particle beam (e.g., fast atom beam, and ion beam), etching by a reactive gas, and etching by a corrosive liquid.

Figure 1E:
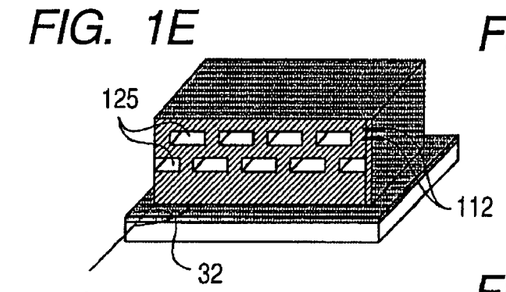

In the next step, as illustrated in FIG. 1E, base material 20 is dry-etched in the direction of second angle 32 to first face 100 by use of mask 110, mask 111 and coating film 40. By the dry etching, the parts of the base material not masked by mask 110, mask 111, and coating film 40 in the direction of second angle 32 are removed to form pores 125 through base material 20. Second angle 32 may be selected in the range from 10° to 90°, preferably from 80° to 90°. Dry etching is preferred because the dry etching is independent of the crystal orientation of the substance, and achieves high anisotropy. That is, the processing proceeds predominantly in the incident direction of the etching particle beam (at second angle 32 to the first face). The dry etching includes reactive ion etching, focused ion beam etching, ion milling, and fast atom beam (FAB) etching.

Then registration marker 112 is formed for marking the relative positions of pores 125 on first face 100 by EB-CVD or FIB-CVD. This registration marker 112 is utilized as the registration mark in formation of a mask pattern on the second face subsequently.

Figure 1F:
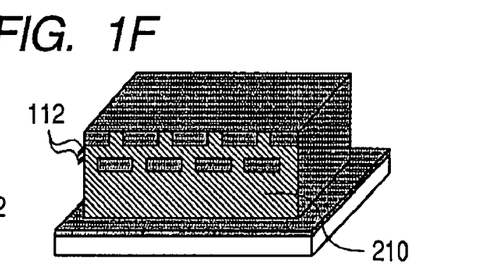

In the next step, as illustrated in FIG. 1F, second mask 210 is formed on second face 200. The method of the mask formation is the same as that in formation of first mask 110 on first face 100. In this second mask formation, the position of the second mask is determined in relation to the position of the first mask by reference to the registration marker 112. In this step for formation of the three-dimensional photonic crystal, only one operation of mask registration is enough, resulting in high processing precision.

Figure 1G:
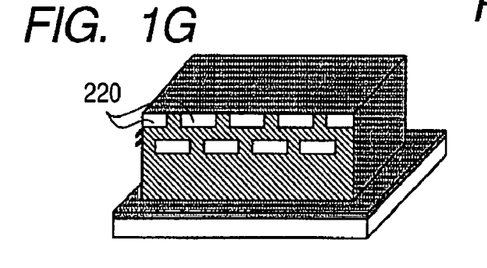

In the next step, as illustrated in FIG. 1G, the portions of the coating film not covered with second mask 210 on the second face is removed to bare portions 220 of second face 200. The processing process is the same as that shown in FIG. 1D.

Figure 1H:
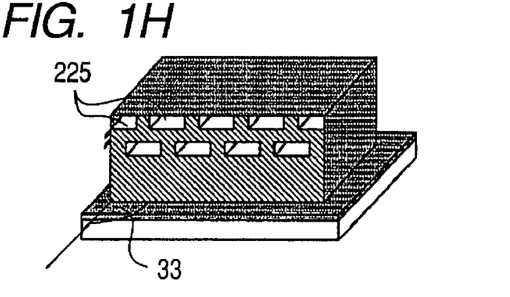

In the next step, as illustrated in FIG. 1H, base material 20 is etched through second face 200 in the direction of third angle 33 by masking with second mask 210 and coating film 40. By the etching, the portions of the base material not protected by mask 210 and coating film 40 are etched in the direction of third angle 33 to form pores 225 in base material 20. Third angle 33 may be selected in the range from 10° to 90°, depending on the intended structure of the photonic crystal and first angle 31 and second angle 32.

Figure 1I:
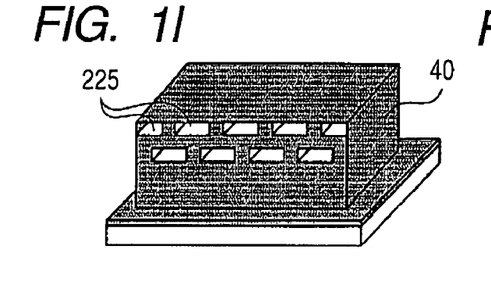

In the next step, as illustrated in FIG. 1I, first mask 110, second mask 210, and second-face-protecting mask 111 are removed. The removal is conducted with a liquid or gas which is capable of removing selectively coating film 40 without corrosion of photonic crystal base material 20 and substrate 10, or by plasma.

Figure 1J:
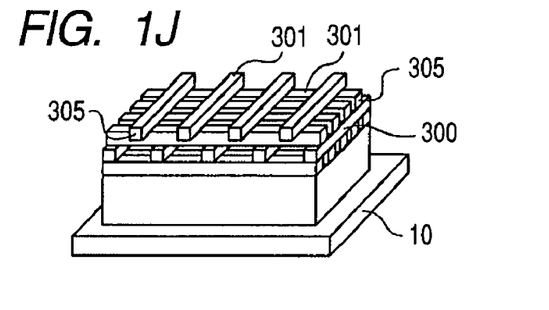

In the next step, as illustrated in FIG. 1J, coating film 40 is removed to bare the photonic crystal to produce the main portion (basic skeleton) of the photonic crystal. The removal of coating film 40 is conducted with a liquid or gas which is capable of removing selectively coating film 40 without corrosion of photonic crystal base material 20 and substrate 10, or by plasma.

The above removal of first mask 110, second mask 210, and second-face-protecting mask 111 may be conducted simultaneously with the removal of coating film 40. Since these masks are attached onto the surface of coating film 40, the removal of coating film 40 causes removal of the masks naturally.

The above process for producing a three-dimensional periodic structure is obviously suitable for any three-dimensional structure which can be formed by dry etching from the two faces. The three-dimensional structure may contain a nonperiodic arrangement portion. As a simple example, a portion of the masks may be deformed to introduce a defect in the three-dimensional structure.

In the above description, the processing from the first face and the second face is conducted respectively by one processing operation, but the processing may be repeated several times, or another processing method may be combinedly employed.

The present invention conducts processing by masking and etching at any two adjoining faces of a base material of the photonic crystal.

In the process of the present invention, the processing may be conducted from one lateral face (or an end face) and another lateral face of a base material of a photonic crystal, or may be conducted from one main face (upper face or surface) and one lateral face of a base material of a photonic crystal. Thus, suitable selection of the face for the processing enables adjustment of the crystal face and the crystal orientation of the base material for the crystal face and the crystal orientation of the photonic crystal after the processing. Further, for the size of the photonic crystal to be formed, the face for processing can be selected for ease of the processing. The face to be processed is preferably selected in consideration of the structure (design) of the intended photonic crystal, the processing scale, and so forth.

EXAMPLES

Examples of the present invention are described specifically by reference to drawings without limiting the invention in any way.

Example 1

Example 1 is described by reference to FIGS. 1A to 1J. In this Example, a photonic crystal base material is processed through two lateral faces adjoining to each other to form a three-dimensional photonic crystal.

In FIGS. 1A to 1J, the numerals denote the followings: 10, a silicon (Si) substrate; 20, a photonic crystal base material derived from the Si substrate; 100, a first lateral face (first face) of photonic crystal base material 20; 200, a second lateral face (second face) adjoining to first face 100 of the photonic crystal base material; 31, a first angle of adjoining between first face 100 and second face 200.

Photonic crystal base material 20 is cut out from Si substrate 10 of about 500 μm thick by a semiconductor microfabrication process as illustrated in FIG. 1A. The microfabrication process includes photolithography employing a photoresist and anisotropic etching of Si by reactive ion beam etching. Obtained base material 20 has a height of about 100 μm. First face 100 and second face 200 have respectively a breadth of about 20 μm. First face 100 and second face 200 adjoin to each other at adjoining angle 31 of about 90°, and are nearly perpendicular to the main face of the substrate.

On the faces of base material 20 and substrate 10, a thermal oxidation film is formed as coating film 40 as illustrated in FIG. 1B. Specifically, base material 20 formed on substrate 10 is placed in a quartz furnace and is heat treated in an oxygen atmosphere at about 900° C. for tens of minutes to form a $SiO_2$ coating film of about 0.5 μm thick on the surface of base material 20.

On first face 100 of the base material coated by coating film 40, first mask 110 is formed as illustrated in FIG. 1C. In this mask formation, to protect the coating film on second face 200, protection mask 111 is formed in a breadth nearly equal to the thickness (about 0.5 μm) of coating film 40 on the edge portion of first face 100 adjoining to second face 200. The mask is formed by deposition of a pattern of tungsten (W) in a thickness of about 0.1 μm by EB-CVD with $W(CO)_6$ gas. The arrangement period of the pattern is about 1 μm. Therefore, the three-dimensional photonic crystal to be formed has a length of about 20 arrangement periods in the lateral direction and a length of about 30 arrangement periods in the height direction.

The pattern of first mask 110 is transferred onto $SiO_2$ coating film 40 as illustrated in FIG. 1D. Specifically, the $SiO_2$ coating film on the first face is partly removed from the portions not protected by mask 110 and mask 111 by reactive ion etching employing a $C_4F_8$—$O_2$ gas mixture to bare the portions of Si of first face 120 under the coating film.

Then, Si base material 20 is processed by reactive ion etching by a Bosch process through W masks 110 and 111 and $SiO_2$ coating film 40 in the direction nearly perpendicular to first face 100 as illustrated in FIG. 1E. The reaction gas for etching is $SF_6$ gas, and that for formation of the coating film (protection film) is $C_4F_8$ gas.

The anisotropic etching treatment removes the portions of base material 20 not protected by W masks 110 and 111 and $SiO_2$ coating film 40 to bore pores 125 into base material 20 in the direction perpendicular to first face 100.

Then structure 112 is formed as a registration marker for formation of second mask 210 on the second face in the same manner as formation of first mask 110 by EB-CVD.

On second face 200 of photonic crystal base material 20, second mask 210 is formed as illustrated in FIG. 1F in the same manner as in formation of first mask 110 on the aforementioned first face 100. The position of the second mask is adjusted to correspond to the position of the first mask by utilizing the above structure 112 as the marker for registration. In this process for formation of the three-dimensional photonic crystal, the mask registration is conducted only once, resulting in high processing precision in the positional registration.

The pattern of second mask 210 is transferred onto $SiO_2$ coating film 40 as illustrated in FIG. 1G. Then, the $SiO_2$ coating film on the second face is locally removed from the portions not protected by second mask 210 to bare the portions of Si of second face 220 under the coating film in the same manner as in the processing operation illustrated in FIG. 1D.

Then, Si base material 20 is processed by reactive ion etching by a Bosch process through second W masks 210 and $SiO_2$ coating film 40 in the direction nearly perpendicular to second face 200 as illustrated in FIG. 1H. The reaction gas for etching is $SF_6$ gas, and that for formation of the coating film (protection film) is $C_4F_8$ gas.

The anisotropic etching treatment removes the portions of base material 20 not protected by W mask 210 and $SiO_2$ coating film 40 to bore pores 225 into base material 20 in the direction perpendicular to second face 200.

The W masks (including first mask 110, second mask 210, and mask 111 for protecting second face) are removed by using a solution mixture containing $HNO_3$, HCl, and pure water as illustrated in FIG. 1I.

Then, $SiO_2$ coating film 40 is removed to bare the photonic crystal to complete the production of the main portion of the photonic crystal as illustrated in FIG. 1J. The removal of $SiO_2$ coating film 40 is conducted with a buffered hydrofluoric acid containing hydrofluoric acid and $NH_4F$ as a buffer.

In practical operation, the step of removal of the W masks as illustrated in FIG. 1I may be omitted since the W masks formed on the $SiO_2$ coating film can be removed completely together with the $SiO_2$ coating film.

Through the above steps, a woodpile type of three-dimensional photonic crystal of Si is obtained which has an arrangement period of 1 µm and the lengths in the respective directions corresponding to about 20 or more arrangement periods.

Example 2

Example 2 is described by reference to FIGS. 2A to 2I. In this Example, the main face (upper face) of the substrate and one lateral face of the substrate adjoining to the main face are processed to form a three-dimensional photonic crystal. This Example 2 is different from Example 1 in the face to be processed for masking and etching. In Example 1 above, one lateral face and another lateral face adjoining thereto of the base material of the photonic crystal are processed, whereas in this Example 2, one main face and one lateral face adjoining thereto are processed.

The same descriptions as in Example 1 are omitted. The production process of this Example is described below.

Figure 2A:
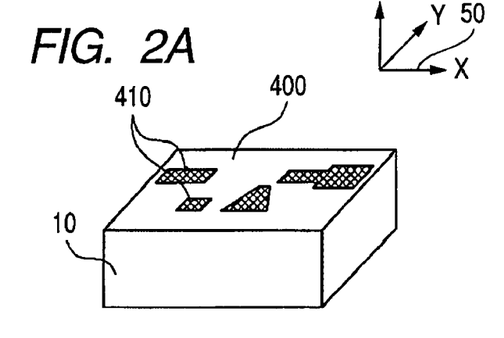
FIGS. 2A, 2B, 2C, 2D, 2E, 2F, 2G, 2H, and 2I are drawings for explaining another embodiment of production of the three-dimensional periodic structure of the present invention.

Firstly, main face 400 of a substrate is processed by a fine semiconductor processing technique as illustrated in FIG. 2A. This fine processing is equivalent to the processing of the first lateral face in Example 1. However, since main face 400 is processed on the top surface, the pattern can be formed not only by EB-CVD and FIB-CVD but also by photolithography, electron beam exposure, or a like method. Therefore fine patterns can be formed in plural regions simultaneously over a large area of the substrate face: different structures and different areas of patterns can be formed in the regions to meet the uses. Therefore, three-dimensional photonic crystals having different performances can be integrated as necessary.

Specifically, on main face 400 of Si substrate 10 of about 500 µm thick, thin films of Cr (about 5 nm thick) and Au (about 50 nm thick) are deposited successively by electron beam vapor deposition. An electron beam resist is applied on the thin metal film layer. The resist is subjected to electron beam exposure to form two-dimensional fine patterns in various shapes in plural regions of various areas. The patterns on the electron beam resist are transferred onto the Cr/Au thin film layer by ion milling, and the portions not protected by the electron beam resist of main face 400 of the Si substrate are bared. Then, main face 400 of the Si substrate is etched by reactive ion etching of Si in the direction nearly perpendicular to main face 400 of the Si substrate according to a Bosch process. SF$_6$ gas is used for the etching, and C$_4$F$_8$ gas is used for formation of the coating film (protection film).

The anisotropic etching treatment forms deep pores perpendicular to main face 400 of the Si substrate in the portions of the Si substrate not protected by the electron beam resist and the metal thin film. The depth of the pores is about 30 µm in the finest patterns. Then the electron beam resist, the Au thin film, and the Cr thin film are removed respectively by a suitable etchant. Through the above steps (not shown in the drawing), fine pattern regions 410 are formed on main face 400 as illustrated in FIG. 2A.

Figure 2B:
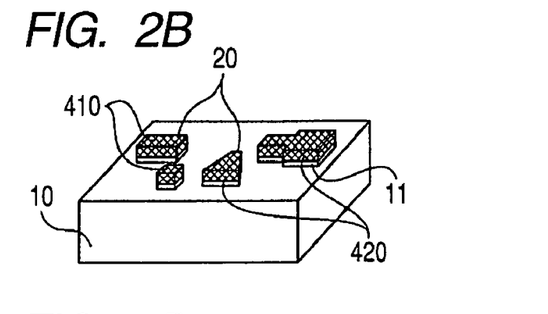

Then, the fine patterns are carved by photolithography and deep etching of Si (Bosch process) to form the lateral wall faces of the fine patterns, as illustrated in FIG. 2B. For precise formation of the lateral wall faces, the etching is conducted in the direction nearly perpendicular to main face 400 of the substrate to an etching depth of 100 µm. After the deep etching, a part 11 of substrate 10 comes to constitute the bottom portions of the respective fine pattern regions. The regions to be etched on main face 400 are made to overlap fine pattern region 410: the etching is conducted to cut off the periphery of the fine pattern regions. In such a manner, plural base materials 20 of photonic crystals are formed which have respectively processed first face. The base materials have a height of about 100 µm, and lengths and breadths in the range from about 5 µm to about 1 mm.

Figure 2C:
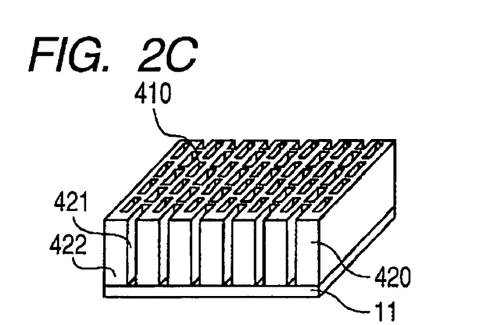

FIG. 2C is an enlarged view of a part of base material 20 of the photonic crystal. The photonic crystal is assumed to have a woodpile structure having a arrangement period of about 1 µm, as an example. In FIG. 2C, the numerals denote followings: 410, the first face; 420, the second face; 421, a groove and 422, a flat portion of second face 420. In this base material, first face 410 and second face 420 are adjoined nearly perpendicularly to each other. The second face has a breadth of about 100 µm: namely the photonic crystal has a thickness corresponding to about 100 arrangement-periods. The photonic crystal material, when viewed from the second face, has a thickness of about 20 µm: the thickness corresponding to 20 arrangement periods.

Figure 2D:
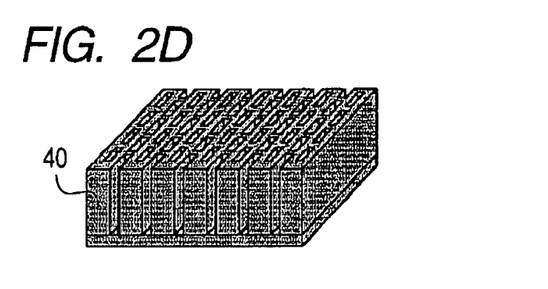

On the surface of base material 20 and substrate 10, a Si thermal-oxidized film (SiO$_2$) is formed as coating film 40 as shown in FIG. 2D in the same manner as in Example 1.

Figure 2E:
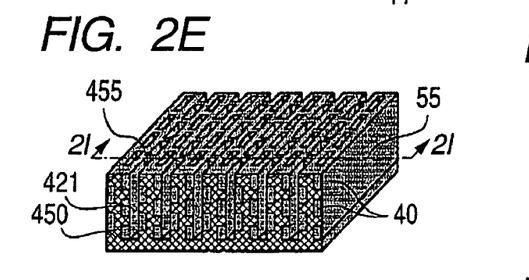

Thereafter, on second face 420 of the base material having coating film 40 formed thereon, prescribed masks are formed as illustrated in FIG. 2E. In this mask formation, owing to the projection-and-depression on the second face, masks are formed on grooves 421 and flat portions 422 respectively. The shape of mask 450 formed on flat portions 422 is shown in the drawing. The shape of mask 455 formed on grooves 421 is shown in FIG. 2I. FIG. 2I is a sectional view of the photonic crystal base material cut along line 2I-2I in FIG. 2E in the direction parallel to second face 420. The masks are formed in the same manner as in Example 1, except that the registration of the mask formation is made by reference to the grooves 421. Thereby, the precision of the registration of 5 nm or higher is achievable in the lateral direction. The registration in the height direction is made by reference to the top edge of second face 420. A small deviation in the height direction affects only the thickness of the first top layer structure. In this process for formation of the three-dimensional photonic crystal, the mask registration is conducted only once, resulting in high processing precision of positional registration.

Figure 2F:
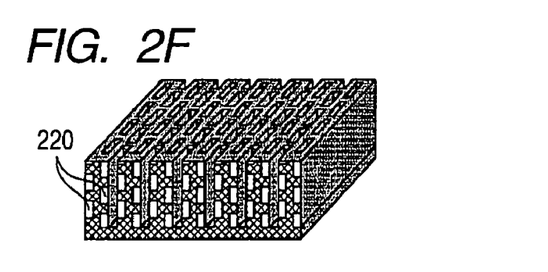
Figures 2G, 2H, 2I:
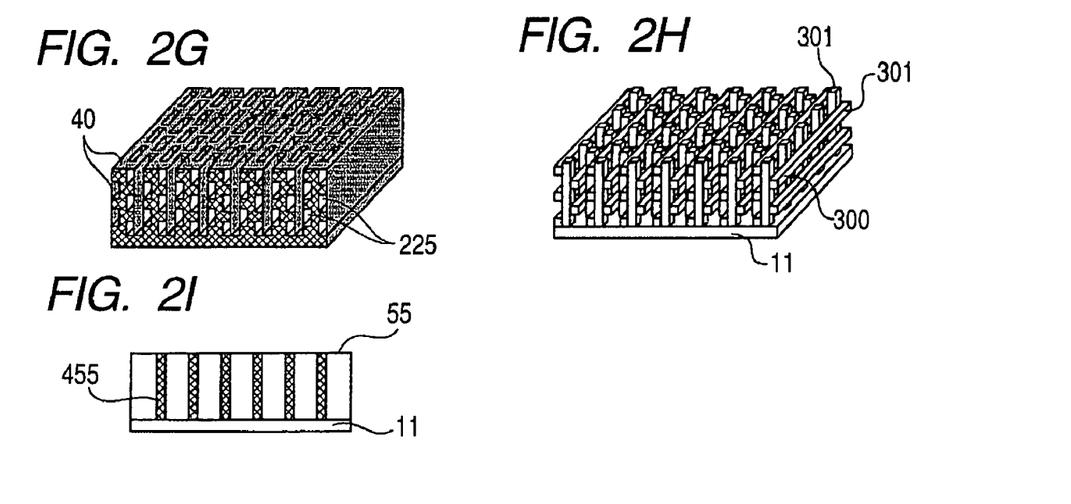

The patterns of second masks 450 and 455 are transferred onto SiO$_2$ coating film 40 to bare Si portion 220 of second face 420 as illustrated in FIG. 2F in the same manner as in the pattern transfer in Example 1.

Then fine pores 225 are formed into base material 20 nearly perpendicularly to second face 420 by employing second masks 450 and 455 and SiO$_2$ coating mask 40 as illustrated in FIG. 2G in the same manner as the pore formation in Example 1.

W masks 450 and 455 and SiO$_2$ coating film 40 are removed to bare the photonic crystal as illustrated in FIG. 2H to complete the production of main portion of the photonic crystal. The removal of the masks and the coating film is conducted in the same manner as in Example 1

Through the above steps, from Si as the material, a woodpile type of three-dimensional photonic crystal is obtained which has an arrangement period of 1 µm, and dimensions corresponding to not less than about 20 arrangement periods in respective each direction.

Example 3

Example 3 is described by reference to FIG. 3. In this Example 3, three-dimensional photonic crystals are produced which have various rod sectional shapes. The rods have uniform sectional shapes and sectional areas in the rod length direction.

The three-dimensional photonic crystal of this Example, which is molded integrally, does not have isolated rods as the structural unit, being different from conventional woodpile structures. For comparison, the unit constructing the three-dimensional photonic crystal of this Example is defined as a "rod" in this Example. Further, when the cross-sectional shapes and cross-sectional areas are uniform in the length direction of the defined rod, the section perpendicular to the rod length direction is defined as a "rod section" here.

In the preceding descriptions, the cross-sectional shape of the rod is rectangular. On the other hand in this Example, the three-dimensional photonic crystal may be constructed from rods having any cross-sectional shape. FIG. 3 illustrates cross-sectional shapes of rods which can be produced according to the present invention, the shapes are not limited thereto.

Figure 3:
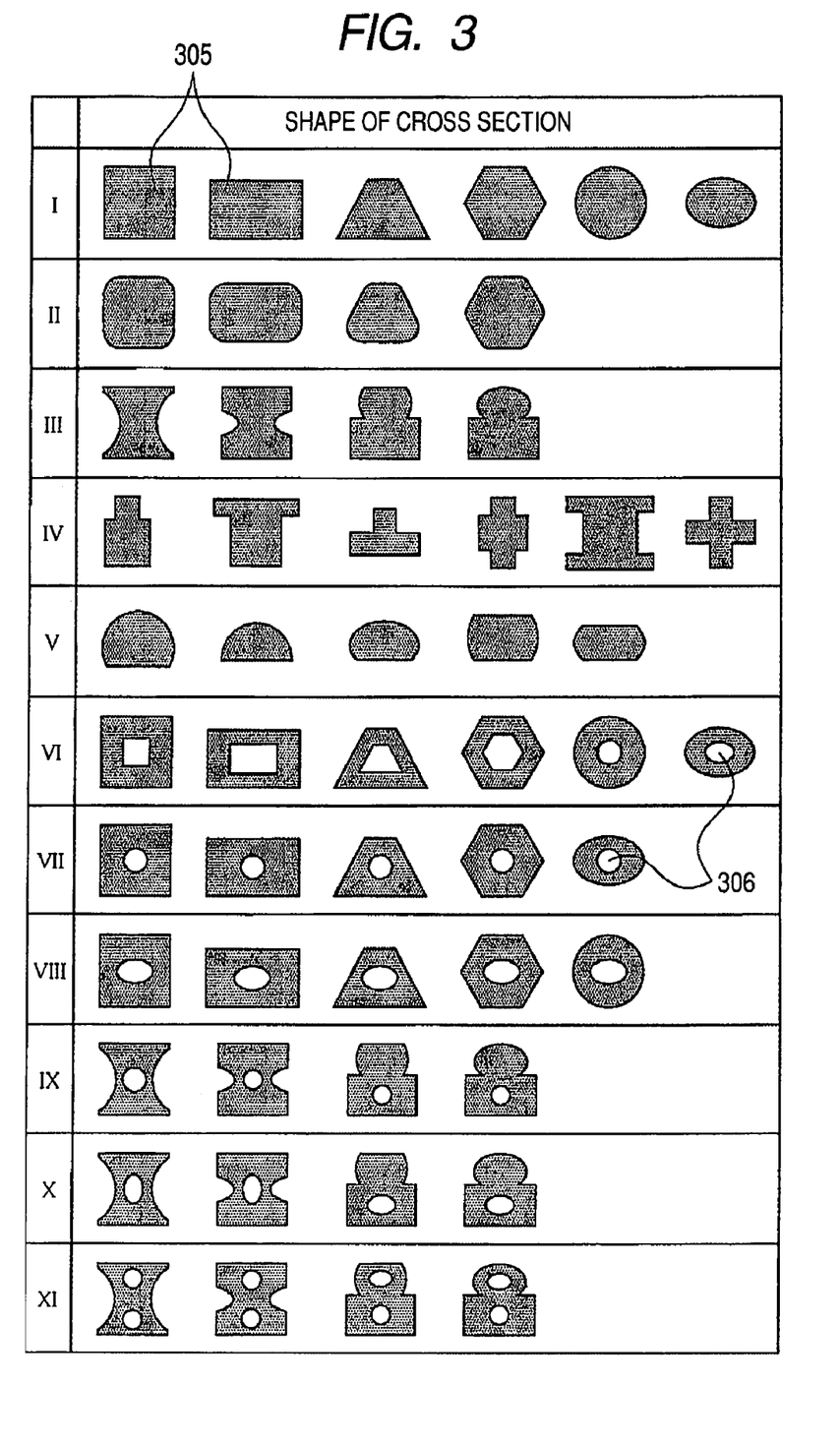
FIG. 3 is a drawing for explaining examples of the shape of the cross-section of the rod of the three-dimensional periodic structure which can be produced by the present invention.

FIG. 3 includes various structures which can be produced according to the present invention, but cannot be readily produced by conventional lamination processes: typical examples are hollow rod structures of Groups VI to XI illustrated in FIG. 3.

The three-dimensional photonic crystal constructed from the rods having a cross-sectional shape illustrated in FIG. 3 can be produced by the process described in Example 1 or Example 2 of the present invention. Therefore the details of the production process are not described here.

Example 4

Example 4 is described by reference to FIGS. 4A, 4B, 5A, 5B, 6A, and 6B. In this Example, the rods of the three dimensional photonic crystal are not uniform in the cross-sectional shape and the cross-sectional area along the length direction.

The three-dimensional photonic crystal of this Example 4 can be produced through the process described in Example 1 or Example 2. Therefore, the details of the production process are not described here. The structure of the three-dimensional photonic crystal and the mask for the production thereof in this Example are described below.

Figure 4A:
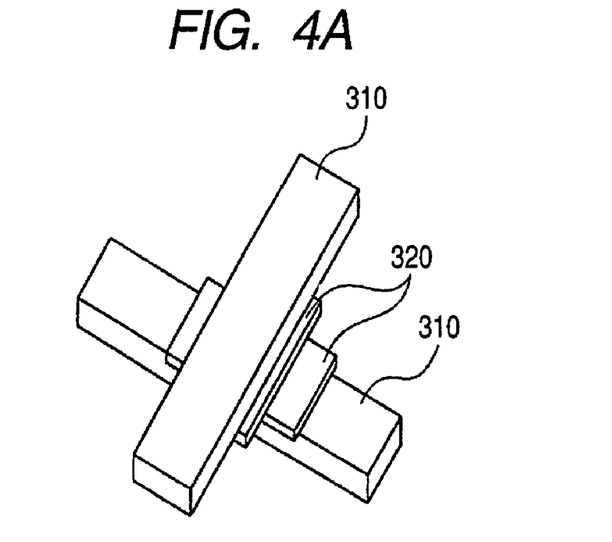
FIGS. 4A and 4B are drawings for explaining still another embodiment of production of the three-dimensional periodic structure of the present invention.
Figure 4B:
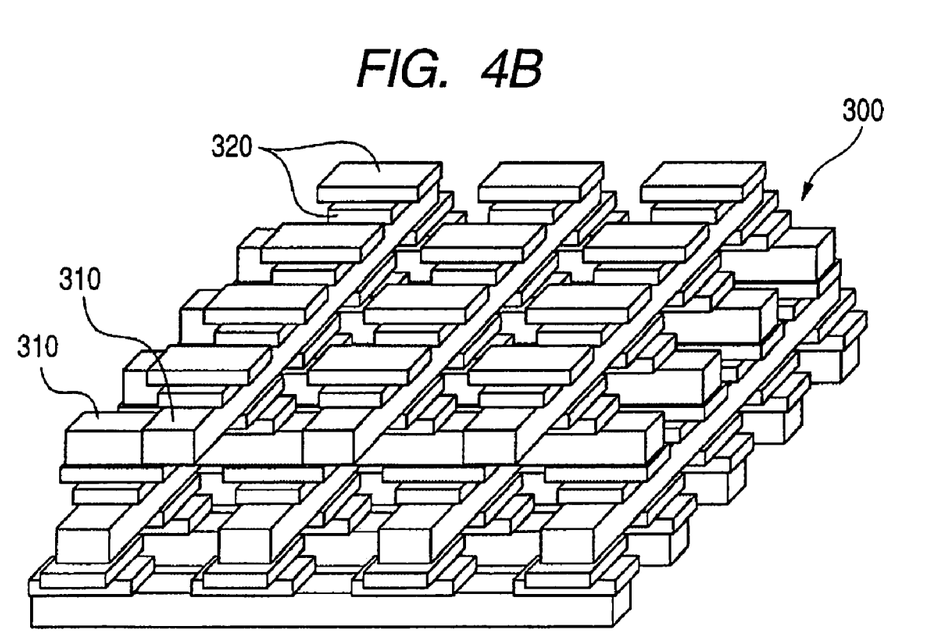

When the cross-sectional shape and the cross-sectional area of the rods in the three-dimensional photonic crystal are arbitrarily variable in the rod length direction, the flexibility in design of the device is improved and the performance of the device can also be improved. For example, a prescribe joint formed at the crossover point of the upper and lower crossing rods will broaden the band gap of the photonic crystal. In the descriptions below, the three-dimensional photonic crystal structure having the joints is called a joint rod structure. An example of the joint rod structure is illustrated in FIG. 4A and FIG. 4B In the joint rod structure shown in FIG. 4A and FIG. 4B, two plate-shaped joints 320 are provided at the crossover point of the upper and lower rods 310. The length direction of each joint is made to conform to the length direction of each rod. The dimensions of the joint rod structure are, for example, as follows: rod length, about 100 µm; planar arrangement period of the rods, about 250 nm; rod layer number in thickness direction, 12 layers; rod breadth, about 80 nm; rod thickness, about 50 nm; joint breadth, about 100 nm; joint length, about 150 nm; joint thickness, about 20 nm.

Figure 5A:
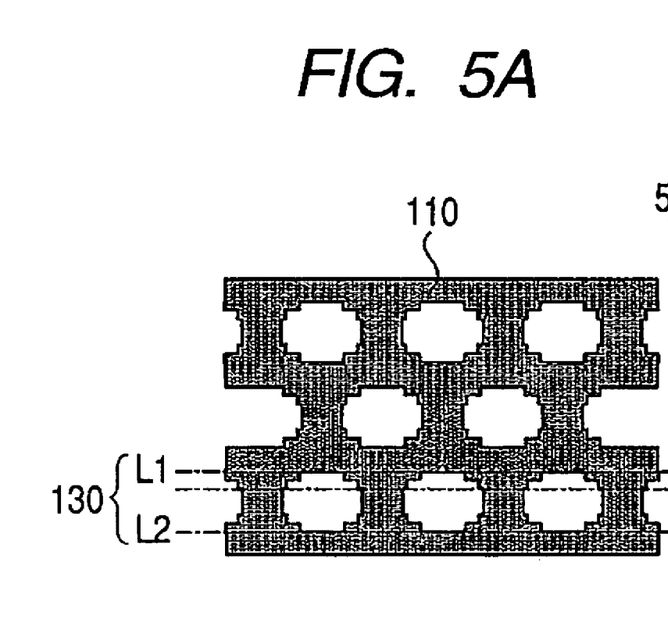
FIGS. 5A and 5B are drawings for explaining the shape of the mask for production of the three-dimensional periodic structure of the present invention.
Figure 5B:
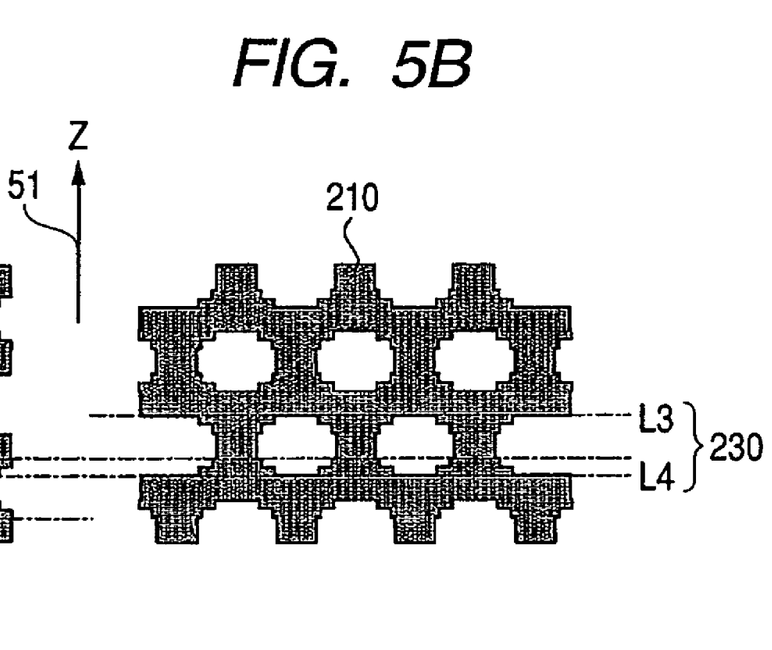

FIG. 5A and FIG. 5B are drawings for explaining the mask for producing the above joint rod structure. For ease of understanding, the first face and the second face are assumed to be perpendicular to each other in the z direction (direction indicated by arrow mark 51). FIG. 5A shows a part of first mask 110 to be formed on the first face, and FIG. 5B shows a part of second mask 210 to be formed on the second face. Mask 110 and mask 220 are placed at the same height in the z direction.

In FIGS. 5A and 5B, portion 130 of the first mask between contour lines L1 and L2 is employed for processing one layer of the photonic crystal structure from the first face, and portion 230 of the second mask between contour lines L3 and L4 is employed for processing another layer of the photonic crystal structure from the second face. Portion 130 of the first mask and portion 230 of the second mask serves for formation of two layers adjacent in z direction of the photonic crystal.

Figure 6A:
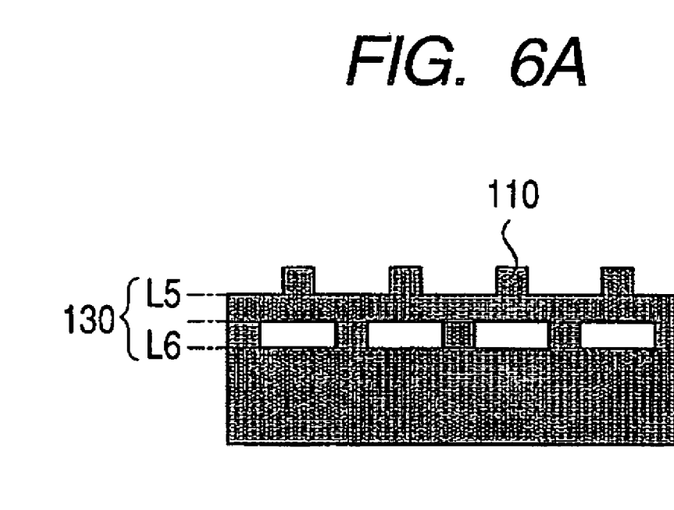
FIGS. 6A and 6B are drawings for explaining the shape of the mask for production of the tree-dimensional structure of the present invention.
Figure 6B:
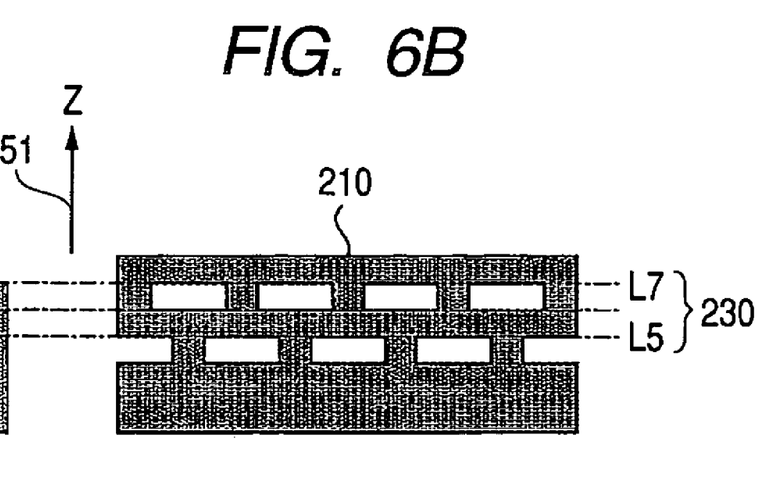

For comparison, first mask 110 and second mask 210 employed in production of the woodpile structure in Example 1 are illustrated partially in FIGS. 6A and 6B in the same style as in FIGS. 5A and 5B. In FIGS. 6A and 6B, portion 130 of the first mask between contour lines L5 and L6 is employed for processing the one layer of the photonic crystal structure from the first face, portion 230 of the second mask between contour lines L7 and L5 is employed for processing the one layer of the photonic crystal structure from the second face. Portion 130 of the first mask and portion 230 of the second mask serves for formation of two layers adjacent in z direction of the photonic crystal. As understood from contour lines L5, L6, and L7, the layer processed with mask 110 in FIG. 6A and the layer processed with mask 210 shown in FIG. 6B do not share a common portion and does not overlap. Thus, in processing with mask 210, the layer processed with mask 110 is completely protected by mask 210. Thereby the woodpile structure is produced in which the rod cross-sectional shape and the rod cross-sectional area are uniform along the rod length direction.

On the other hand, in this Example, as illustrated in FIGS. 5A and 5B, the layer processed with the mask 110 and the layer processed with mask 210 share a common portion in the z direction and overlap each other. The common portion is formed between the contour lines L1 and L4. The common portion, after processing with first mask 110, is processed again with second mask 210. By the double processing, joint portion 320 is formed in the overlapping portion as illustrated in FIGS. 4A and 4B. Therefore, rod joint portion 320 can be formed simultaneously with formation of rod portions 310 by simple double processing by employing first mask 110 and second mask 210.

According to the process of the present invention, a three-dimensional photonic crystal can be produced which is constituted of rods non-uniform in the cross-sectional shape and cross-sectional area along the rod length direction like the joint rod structure.

According to the present invention, a complicated three-dimensional photonic crystal, especially a three-dimensional nano-photonic crystal can be produced in a simple process with high precision at a low cost. The structure is continuous, and does not incorporate a dirt or a like contaminant in the formation process, whereby undesired scattering will not occur and the device performance is higher.

Further according the present invention, a structure having a complicated shape can be produced which cannot be produced by a conventional technique. Therefore, the design of the device is more flexible, and development of novel functional devices are expected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-043968 filed on Feb. 21, 2006 which is hereby incorporated by reference herein in its entirety.

What is claimed is:

1. A process for forming a three-dimensional photonic crystal, which comprises the steps of:
   providing a base material having a first face and a second face adjoining to each other at a first angle;
   forming a first mask on the first face;
   dry-etching the first face in a direction at a second angle to the first face to remove a portion of the base material not protected by the first mask;
   forming a second mask on the second face;
   and dry-etching the second face in a direction at a third angle to the second face to remove a portion of the base material not protected by the second mask, thereby forming the three-dimensional photonic crystal.

2. The process for producing a three-dimensional photonic crystal according to claim 1, wherein the base material of the three-dimensional crystal is a single crystal or a dielectric material in an amorphous state.

3. The process for producing a three-dimensional photonic crystal according to claim 1, wherein the first mask and the second mask are respectively a patterned deposit formed on the first face or the second face by chemical vapor deposition induced by at least one energy beam selected from focused electromagnetic waves of electron beams, focused ion beams and laser beams.

4. The process for producing a three-dimensional photonic crystal according to claim 1, wherein the first mask and the second mask are formed from at least one material selected from the group consisting of C, W, Mo, Ni, Au, Pt, GaN, Si, and $SiO_2$, and contain impurity materials at a content not more than 50%.

5. The process for producing a three-dimensional photonic crystal according to claim 1, wherein the step of dry-etching is conducted by reactive ion etching, or directional accelerated particle beam etching.

6. The process for producing a three-dimensional photonic crystal according to claim 1, wherein the first angle ranges from 10° to 170°.

7. The process for producing a three-dimensional photonic crystal according to claim 1, wherein the second angle and the third angle range from 10° to 90°.

8. The process for producing a three-dimensional photonic crystal according to claim 1, wherein the process further comprises the steps of:
   forming a coating film on at least a part of the first and second faces before formation of the first and second masks, and
   removing selectively at least a part of the coating film by etching treatment after the formation of the first and second masks.

9. The process for producing a three-dimensional photonic crystal according to claim 8, wherein the step of forming the coating film is conducted by heat-treating the base material in an environmental gas to allow the surface component of the base material to react with the environmental gas to form an oxide film or nitride film on at least a part of the surface of the base material.

10. The process for producing a three-dimensional photonic crystal according to claim 8, wherein the etching treatment is conducted by any of reactive ion etching, directional accelerated particle beam etching, reactive gas etching, and corrosive liquid etching.

11. The process for producing a three-dimensional photonic crystal according to claim 8, wherein, in the step of forming a coating film, the coating film is formed on at least a portion of the surface of the base material by chemical vapor deposition or atomic layer deposition.

12. The process for producing a three-dimensional photonic crystal according to claim 11, wherein the coating film is formed from at least one material selected from Cu, W, TiN, $Si_3N_4$, SiN and $SiO_2$.

* * * * *